No. 853,311. PATENTED MAY 14, 1907.
W. E. MARHOFF.
FISHING REEL.
APPLICATION FILED OCT. 22, 1906.
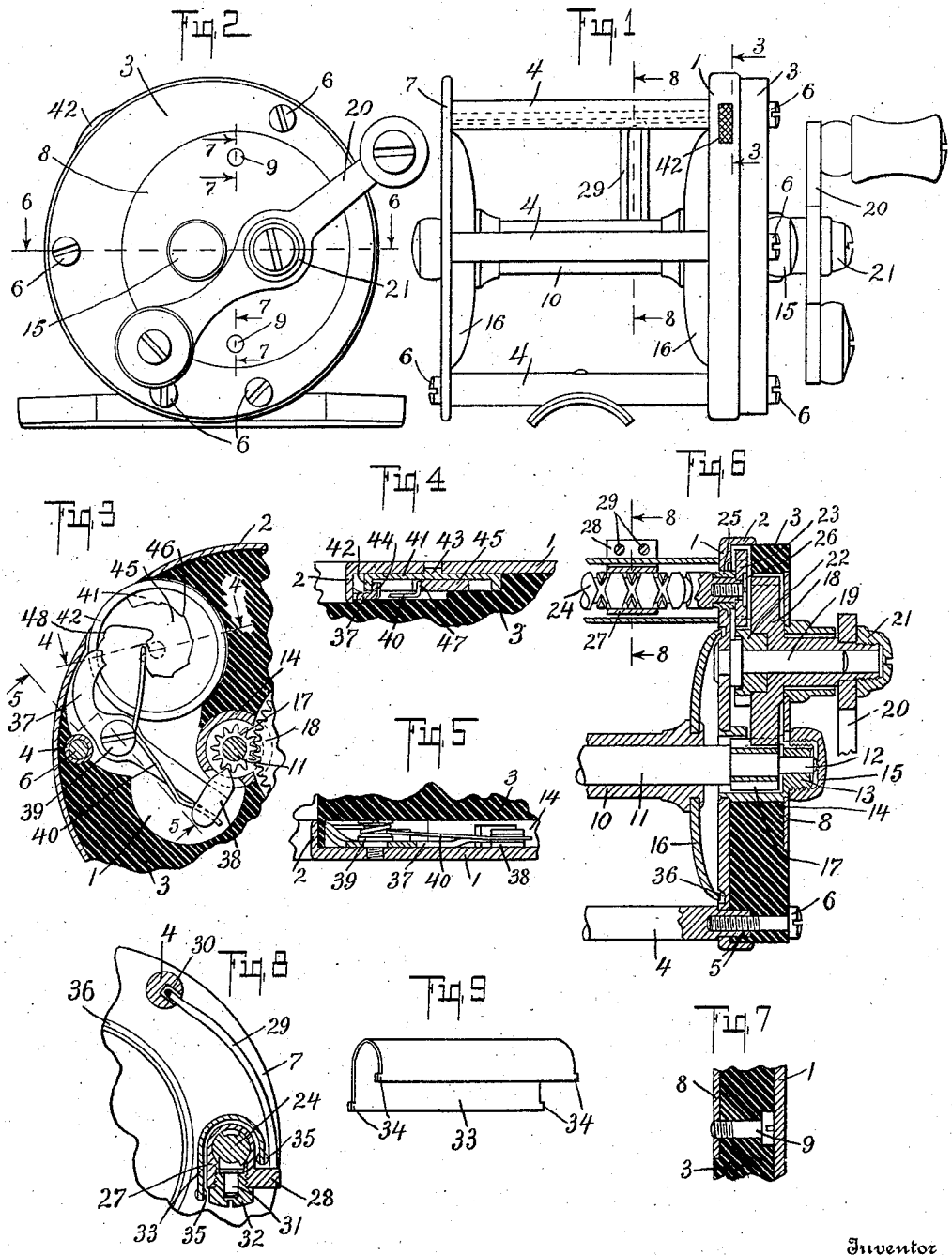
Witnesses
Lulu Grunfeld
Clara E. Broden
Inventor
Walter E. Marhoff
By Chappell & Earl
Attorneys

UNITED STATES PATENT OFFICE.

WALTER E. MARHOFF, OF KALAMAZOO, MICHIGAN, ASSIGNOR TO MARHOFF REEL CO., OF KALAMAZOO, MICHIGAN, A CORPORATION.

FISHING-REEL.

No. 853,311.     Specification of Letters Patent.     Patented May 14, 1907.

Application filed October 22, 1906. Serial No. 340,015.

*To all whom it may concern:*

Be it known that I, WALTER E. MARHOFF, a citizen of the United States, residing at the city of Kalamazoo, county of Kalamazoo, and State of Michigan, have invented certain new and useful Improvements in Fishing-Reels, of which the following is a specification.

This invention relates to improvements in fishing reels.

The objects of this invention are,—First, to provide an improved frame for fishing reels which is economical to produce and at the same time is strong and rigid and one which is attractive and ornamental in appearance. Second, to provide in a fishing reel an improved level winding mechanism in which the line guide driving shaft or screw is fully protected. Third, to provide in a fishing reel an improved click mechanism which may be adjusted to regulate the tension so that it may be used as a drag or brake, when desired.

Further objects, and objects relating to structural details, will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing, forming a part of this specification, in which, Figure 1 is a side elevation of a fishing reel embodying the features of my invention. Fig. 2 is an end elevation thereof, looking from the right of Fig. 1. Fig. 3 is an enlarged detail transverse section taken on a line corresponding to line 3—3 of Fig. 1, showing details of the click or drag mechanism. Fig. 4 is a detail section taken on a line corresponding to the broken line 4—4 of Fig. 3. Fig. 5 is a detail section taken on a line corresponding to the broken line 5—5 of Fig. 3. Fig. 6 is an enlarged detail longitudinal section taken on a line corresponding to line 6—6 of Fig. 2. Fig. 7 is an enlarged detail section taken on a line corresponding to line 7—7 of Fig. 2, showing means for securing and supporting the head face plate 8. Fig. 8 is an enlarged detail taken on the line corresponding to line 8—8 of Fig. 1 showing details of the level winding mechanism. Fig. 9 is a perspective view of the housing or shield 33 for the screw shaft 24.

In the drawing, the sectional views are taken looking in the direction of the little arrows at the ends of the section lines, and similar reference characters refer to similar parts throughout the several views.

Referring to the drawing, the inner plate 1 is mounted upon the shouldered ends 5 of the pillars 4, as clearly appears in Fig. 6. This head plate is provided with an outwardly projecting peripheral flange 2 adapted to receive the outer head plate 3, which is fitted into this flange and is adapted to rest against the outer side of the plate 1. The plate 3 is preferably formed of hard rubber, hard fiber or other suitable material combining strength and lightness. The plate 3 is chambered to receive the reel gear, as will be pointed out later. The plate 3 is bored to receive the ends of the pillars as clearly appears in Fig. 6. The head plates are preferably secured upon the pillars by screws 6 arranged through the plates 3 from the outside, the same being tapped into the ends of the pillars, as clearly appears in Fig. 6.

The tail plate of the reel preferably consists of a disk-like metal plate 7 mounted upon the ends of the pillars in the usual way.

The spool 10 is mounted upon the shaft 11, the journal 12 of which is arranged in a suitable bearing 13, as clearly appears in Fig. 6. The bearing 13 is provided with a tubular portion 14, the inner end of which is secured to the inner head plate 1, as clearly appears from the drawing. The bearing 13 is threaded to receive the cap 15. The spool is provided with suitable flanges 16, the peripheries of which, when the reel is assembled, project into an annular groove 36 formed in the inner head plate 1. On the spool shaft is a pinion 17 with which the driving gear 18 is arranged to mesh. This gear 18 is mounted upon the journal 19 which is carried by the head plate 1. The gear 18 is provided with an outwardly projecting hub on which the crank 20 is mounted, the crank being secured thereon preferably by means of the threaded cap 21.

The reversely threaded line guide shaft 24 is connected by the pinions 22 and 23 to the gear 18. The pinion 22 is secured to the gear 18 and is arranged to mesh with the pinion 23 on the end of the shaft 24. By this arrangement, the driving gear for the line guide shaft is arranged in a very compact manner, so that it is not necessary to increase the diameter of the reel to accommodate the same. The pinion 23 is preferably secured to the end of the line guide shaft by means of the set screw 26 which is tapped into the end of the shaft. The shaft 24 is mounted in suitable bearings 25 carried by the head plate 1 and in a similar bearing carried by the plate 7, the details of the same not being here illustrated.

A reciprocating carriage 27 is mounted on the line guide shaft 24 and is provided with a shaft engaging pin 31 so as to be driven thereby. This pin is mounted in the screw 32 so that it may be brought into proper relation to engage the threads of the shaft. Over the line guide shaft is a housing or guard 33 which extends from head to head and is adapted to prevent dirt or water from falling upon the shaft from above. This housing is preferably provided with lug-like projections 34 at each end adapted to engage openings 35 in the head plates 1 and 7, so that, when these plates are secured in position on the pillars, they effectively clamp the housing in place. The line guide carriage 27 is provided with a line guide carrying arm 28 which projects outwardly from the carriage at the front. The line guide eye 29 is carried by this arm and preferably consists of a wire loop, the ends of the wire being inserted into the arm. The upper end of the line guide eye is arranged in a longitudinal groove 30 in the pillar 4 above the line guide shaft. This serves as a guide for the upper end of the line guide eye and prevents the revolution of the carriage upon the shaft. By providing the elongated line guide eye, as illustrated, the line passes freely therethrough, the friction and wear on the line being reduced to a minimum. By arranging the housing or shield 33 above the line guide shaft, it is effectively shielded from the dirt and water which may be scraped off or detached from the line when the same is passing through the line guide eye. This is a very great advantage as it keeps the shaft entirely clean, so that the wear thereon is reduced to a minimum and further causes the carriage to move freely thereon, which is, of course, of great advantage. By arranging the upper end of the line guide eye in the groove in the pillar the looping of the line over the eye is prevented.

The outer head plate 3 is also chambered to receive the click mechanism, as clearly appears in Fig. 3. The detent lever 37 is provided with a detent 38 which is arranged to be thrown into engagement with the pinion 18 on the spool shaft. The lever 37 is mounted on the stud 39 carried by the head plate 1. Tension is applied to the lever 37 by means of the spring 40, the same being preferably fulcrumed about the stud 39, one end engaging the lever 37 and the other engaging the cam 45 of the finger piece 41. This finger piece is disk-like in form and is provided with a flange 42 at its periphery and with a cam projection 45 on its inner side. This cam is preferably provided with a series of teeth 46 adapted to serve as stops to hold the finger piece in its adjusted positions, although, when sufficient pressure is applied thereto, the spring readily slips over the teeth. The periphery of the button or finger piece 41 is arranged through the flange 2 of the head plate 1 so as to be manipulated by the thumb of the operator.

The outer end of the lever 37 overlies the finger piece 41 and its end 44 turned outwardly to engage under the flange 42. The finger piece is provided with a cam projection 48 adapted to be brought under the outturned end 44 of the lever to lift and hold the detent out of its engaging position. The finger piece 41 is preferably provided with a central bearing stud 43 on the outer side thereof; see Fig. 4. By arranging the parts as I have illustrated and described, the pressure or tension on the detent may be so adjusted that it serves merely as a click, or when desired, more pressure can be applied so that it serves as a drag or brake.

The structure illustrated has a wide scope of adjustment, but it is evident that by changing the shape of the cam 45 the range of this adjustment can be varied as desired.

The structure is very simple, the number of parts being reduced to a minimum, and it is also very compact.

My improved reel frame is very attractive and ornamental in appearance and is light in weight and at the same time strong and rigid. It is easily assembled or disassembled to afford access to the gear. The flange of the inner head plate 1 protects the outer plate 3 so that it is not likely to be injured. The face plate 8 for the plate 3 not only relieves the plate 3 of practically all strain, but also adds to the appearance of the reel. The housing or shield for the threaded line guide shaft protects the same from water and dirt so that the carriage runs freely thereon and the wear thereon, when thus protected, is materially reduced.

I have illustrated and described my improvements in detail in the form preferred by me on account of structural simplicity and economy, although I am aware that they are capable of considerable variation in structural details without departing from my invention.

Having thus described my invention, what I claim as new and desire to secure by Letters Patent is:

1. In a fishing reel, the combination with pillars having shouldered ends, of an inner head plate of metal having an outwardly projecting peripheral flange mounted on the shouldered ends of said pillars; an outer head plate of hard rubber fitted into the said flange of the said inner head plate and bored to receive the ends of the said pillars, said outer head plate being also chambered to receive the reel gear; screws for securing said plates upon said pillars tapped into the ends thereof, said screws being arranged through said outer head plate; a disk-like metal face plate countersunk into said outer plate; screws for securing the face plate arranged through said outer head plate from the inside thereof; and bearings for the reel spool and gear carried by the said inner face plate.

2. In a fishing reel, the combination with pillars having shouldered ends, of an inner head plate of metal having an outwardly projecting peripheral flange mounted on the shouldered ends of said pillars; an outer head plate of hard rubber fitted into the said flange of the said inner head plate and bored to receive the ends of the said pillars, said outer head plate being also chambered to receive the reel gear; screws for securing said plates upon said pillars tapped into the ends thereof, said screws being arranged through said outer head plate; and a disk-like face plate countersunk into said outer plate; screws for securing the face plate arranged through said outer head plate from the inside thereof.

3. In a fishing reel, the combination with pillars having shouldered ends, of an inner head plate of metal having an outwardly projecting peripheral flange mounted on the shouldered ends of said pillars; an outer head plate of hard rubber fitted into the said flange of the said inner head plate and bored to receive the ends of the said pillars, said outer head plate being also chambered to receive the reel gear; a disk-like metal face plate countersunk into said outer plate and secured thereto; and bearings for the reel spool and gear carried by the said inner face plate.

4. In a fishing reel, the combination with pillars having shouldered ends, of an inner head plate of metal having an outwardly projecting peripheral flange mounted on the shouldered ends of said pillars; an outer head plate of hard rubber fitted into the said flange of the said inner head plate and bored to receive the ends of the said pillars, said outer head plate being also chambered to receive the reel gears; and a disk-like metal face plate countersunk into said outer plate and secured thereto.

5. In a fishing reel, the combination with pillars, of an inner head plate of metal having an outwardly projecting peripheral flange mounted on said pillars; an outer head plate of hard rubber fitted into the said flange of the said inner head plate, said outer head plate being chambered to receive the reel gear; a disk-like face plate countersunk into said outer plate and secured thereto; and bearings for the reel spool and gear carried by the said inner face plate.

6. In a fishing reel, the combination with pillars of an inner head plate of metal having an outwardly projecting peripheral flange mounted on said pillars; an outer head plate of hard rubber fitted into the said flange of the said inner head plate, said outer head plate being chambered to receive the reel gear; and a disk-like metal face plate counter-sunk into said outer plate and secured thereto.

7. In a fishing reel, the combination with pillars, of an inner head plate of metal having an outwardly projecting peripheral flange mounted on said pillars; an outer head plate of hard rubber fitted into the said flange of the said inner head plate, said outer head plate being chambered to receive the reel gear; and bearings for the reel spool and gear carried by the said inner face plate.

8. In a fishing reel, the combination with pillars, of an inner head plate of metal mounted on said pillars; an outer head plate of hard rubber chambered to receive the reel gear; a disk-like metal face plate countersunk into said outer plate and secured thereto; screws for securing the face plate arranged through said outer head plate from the inside thereof; and bearings for the reel spool and gear carried by the said inner face plate.

9. In a fishing reel, the combination with pillars, of an inner head plate of metal mounted on said pillars; an outer head plate of hard rubber chambered to receive the reel gear; a disk-like metal face plate countersunk into said outer plate and secured thereto; and bearings for the reel spool and gear carried by the said inner face plate.

10. In a fishing reel, the combination with pillars, of an inner head plate of metal mounted on said pillars; an outer head plate of hard rubber chambered to receive the reel gear; and a disk-like metal face plate countersunk into said outer plate; screws for securing the face plate arranged through said outer head plate from the inside thereof.

11. In a fishing reel, the combination with pillars, of an inner head plate of metal mounted on said pillars; an outer head plate of hard rubber chambered to receive the reel gear; and a disk-like metal face plate countersunk into said outer plate and secured thereto.

12. In a fishing reel, the combination with frame heads, of a spool; a reversely threaded shaft; driving connections therefor; a line guide carriage mounted on said shaft; a shield or housing arranged over said shaft having projecting lugs at each end adapted to be engaged by said frame heads whereby it is supported; an arm on said carriage projecting from under said housing; an upwardly projecting loop-like line guide eye carried by said arm; and a pillar having a longitudinal groove therein adapted to receive the upper end of said line guide eye, for the purpose specified.

13. In a fishing reel, the combination with frame heads, of a spool; a reversely threaded shaft; driving connections therefor; a line guide carriage mounted on said shaft; a shield or housing arranged over said shaft having projecting lugs at each end adapted to be engaged by said frame heads whereby it is supported; an arm on said carriage projecting from under said housing; and a line guide eye carried by said arm, for the purpose specified.

14. In a fishing reel, the combination with frame heads, of a spool; a reversely threaded shaft; driving connections therefor; a line guide carriage mounted on said shaft; a shield or housing arranged over said shaft; an arm on said carriage projecting from under said housing; an upwardly projecting loop-like line guide eye carried by said arm; and a pillar having a longitudinal groove therein adapted to receive the upper end of said line guide eye, for the purpose specified.

15. In a fishing reel, the combination with frame heads, of a spool; a reversely threaded shaft; driving connections therefor; a line guide carriage mounted on said shaft; a shield or housing arranged over said shaft; and an arm on said carriage projecting from under said housing, for the purpose specified.

16. In a fishing reel, the combination with frame heads, of a spool; a reversely threaded shaft; driving connections therefor; a line guide carriage mounted on said shaft; a shield or housing arranged over said shaft; a line guide eye arranged at the side of said housing and projecting above the same; and a pillar having a longitudinal groove therein adapted to receive the upper end of said line guide eye, for the purpose specified.

17. In a fishing reel, the combination with frame heads, of a spool; a reversely threaded shaft; driving connections therefor; a line guide carriage mounted on said shaft; a line guide eye; and a pillar having a longitudinal groove therein adapted to receive the upper end of said line guide eye, for the purpose specified.

18. In a fish line reel, the combination with the frame, heads, of a spool; a reversely threaded shaft; driving connections therefor; a line guide carriage mounted on said shaft; a shield or housing arranged over and covering said shaft and line guide carriage; an arm on said carriage projecting from under said housing; and a line guide eye carried by said arm, for the purpose specified.

19. In a fishing reel, the combination with a frame, of a spool; a finger piece mounted on a suitable journal in said frame having a flange at its periphery and a toothed cam thereon; a detent lever arranged to engage said flange on said finger piece; a pivot for said lever; a spring mounted on the said pivot for said lever, one end of said spring being arranged to engage said lever and the other to engage the said toothed cam on said finger piece; and a projection on said finger piece adapted to engage said lever for locking it out of its operative position.

20. In a fishing reel, the combination with a frame, of a spool; a finger piece mounted on a suitable journal in said frame having a toothed cam thereon; a detent lever; a pivot for said lever; a spring mounted on the said pivot for said lever, one end of said spring being arranged to engage said lever and the other to engage the said toothed cam on said finger piece; and a projection on said finger piece adapted to engage said lever for locking it out of its operative position, for the purpose specified.

21. In a fishing reel, the combination with a frame, of a spool; a finger piece mounted on a suitable journal in said frame having a flange at its periphery and a cam thereon; a detent lever arranged to engage said flange on said finger piece; a pivot for said lever; a spring mounted on the said pivot for said lever, one end of said spring being arranged to engage said lever and the other to engage the said cam on said finger piece; and a projection on said finger piece adapted to engage said lever for locking it out of its operative position.

22. In a fishing reel, the combination with a frame, of a spool; a finger piece mounted on a suitable journal in said frame having a cam thereon; a detent lever; a pivot for said lever; a spring mounted on said pivot for said lever, one end of said spring being arranged to engage the said cam on said finger piece; and a projection on said finger piece adapted to engage said lever for locking it out of its operative position.

23. In a fishing reel, the combination with a frame, of a spool; a finger piece mounted on a suitable journal in said frame having a flange at its periphery and a toothed cam thereon; a detent lever arranged to engage said flange on said finger piece; a pivot for said lever; a spring mounted on the said pivot for said lever, one end of said spring being arranged to engage said lever and the other to engage the said toothed cam on said finger piece.

24. In a fishing reel, the combination with a frame, of a spool; a finger piece mounted on a suitable journal in said frame having a toothed cam thereon; a detent lever; a pivot for said lever; and a spring mounted on the said pivot for said lever, one end of said spring being arranged to engage said lever and the other to engage the said toothed cam on said finger piece.

25. In a fishing reel, the combination with a frame, of a spool; a finger piece mounted on a suitable journal in said frame having a flange at its periphery and a cam thereon; a detent lever arranged to engage said flange on said finger piece; a pivot for said lever; and a spring mounted on the said pivot for said lever, one end of said spring being arranged to engage said lever and the other to engage said cam on said finger piece.

26. In a fishing reel, the combination with a frame, of a spool; a finger piece mounted on a suitable journal in said frame having a cam thereon; a detent lever; a pivot for said lever; and a spring mounted on the said pivot for said lever, one end of said spring being arranged to engage the said cam on said finger piece.

27. In a fishing reel, the combination with a frame, of a spool; a finger piece mounted on a suitable journal in said frame having a flange at its periphery and a toothed cam thereon; a detent lever arranged to engage said flange on said finger piece; a spring for applying tension to said lever arranged to engage the said toothed cam on said finger piece; and a projection on said finger piece adapted to engage said lever for locking it out of its operative position.

28. In a fishing reel, the combination with a frame, of a spool; a finger piece mounted on a suitable journal in said frame having a toothed cam thereon; a detent lever; a spring for applying tension to said lever arranged to engage the said toothed cam on said finger piece; and a projection on said finger piece adapted to engage said lever for locking it out of its operative position.

29. In a fishing reel, the combination with a frame, of a spool; a finger piece mounted on a suitable journal in said frame having a flange at its periphery and a cam thereon; a detent lever arranged to engage said flange on said finger piece; a spring for applying tension to said lever arranged to engage the said cam on said finger piece; and a projection on said finger piece adapted to engage said lever for locking it out of its operative position.

30. In a fishing reel, the combination with a frame, of a spool; a finger piece mounted on a suitable journal in said frame having a cam thereon; a detent lever; a spring for applying tension to said lever arranged to engage the said cam on said finger piece; and a projection on said finger piece adapted to engage said lever for locking it out of its operative position.

31. In a fishing reel, the combination with a frame, of a spool; a finger piece mounted on a suitable journal in said frame; a detent; a tension spring for said detent; a cam on said finger piece for adjusting the tension of said spring; and connections for said detent to said finger piece whereby the detent may be locked out of its operative position by the manipulation of the said finger piece.

32. In a fishing reel, the combination with a frame, of a spool; a finger piece mounted on a suitable journal in said frame; a detent; a tension spring for said detent arranged to be adjusted by said finger piece; and connections for said detent to said finger piece whereby the detent may be locked out of its operative position by the manipulation of the said finger piece.

33. In a fishing reel, the combination with the reel head, of a spool; a disk-like finger piece mounted on a suitable journal in said reel head with its periphery arranged through the periphery of said reel head, said finger piece having a cam on one side thereof; a detent; a spring for applying tension to said detent arranged to engage said cam whereby the tension of said spring is regulated; and means for locking said detent out of its operative position adapted to be actuated by the said finger piece.

34. In a fishing reel, the combination with the reel head, of a spool; a disk-like finger piece mounted on a suitable journal in said reel head with its periphery arranged through the periphery of said reel head, said finger piece having a cam on one side thereof; a detent; and a spring for applying tension to said detent arranged to engage said cam whereby the tension of said spring is regulated.

In witness whereof, I have hereunto set my hand and seal in the presence of two witnesses.

WALTER E. MARHOFF. [L. S.]

Witnesses:
CLARA E. BRADEN,
OTIS A. EARL.